United States Patent
Keil et al.

(10) Patent No.: US 6,852,228 B2
(45) Date of Patent: Feb. 8, 2005

(54) METHOD AND APPARATUS FOR PURIFYING UNTREATED WATER

(75) Inventors: Ulrich Keil, Krefeld (DE); Harald Kusch, Güstrow (DE); Toralf Schönfelder, Rostock (DE); Bernd Bendinger, Lüneburg (DE); Knut Wichmann, Marschacht (DE)

(73) Assignees: Steag Encotech GmbH, Essen (DE); Kraftwerks-und Netzgessellschaft mbH, Rostock (DE); DVGW-Forschungsstelle TUHH, Hamburg (DE)

( * ) Notice: Subject to any disclaimer, the term of this patent is extended or adjusted under 35 U.S.C. 154(b) by 103 days.

(21) Appl. No.: 10/169,054

(22) PCT Filed: Dec. 14, 2000

(86) PCT No.: PCT/EP00/12733

§ 371 (c)(1),
(2), (4) Date: Aug. 22, 2002

(87) PCT Pub. No.: WO01/47816

PCT Pub. Date: Jul. 5, 2001

(65) Prior Publication Data

US 2003/0029794 A1 Feb. 13, 2003

(30) Foreign Application Priority Data

Dec. 23, 1999 (DE) ......................................... 199 62 791

(51) Int. Cl.[7] .............................. C02F 3/04; C02F 3/06; C02F 1/28
(52) U.S. Cl. ....................... 210/618; 210/151; 210/739; 210/741; 210/138
(58) Field of Search .............................. 210/615–618, 210/150–151, 739, 741, 138

(56) References Cited

U.S. PATENT DOCUMENTS

| 3,779,909 | A |   | 12/1973 | Wisfeld et al. |
| H1337 | H | * | 7/1994 | Hoeppel ................... 435/300.1 |
| 5,885,459 | A |   | 3/1999 | Lerche et al. |

FOREIGN PATENT DOCUMENTS

| DE | 43 08 159 | 9/1994 |
| DE | 19512907 | 6/1996 |
| DE | 19524093 | 1/1997 |
| DE | 19712737 | 10/1998 |
| EP | 0607019 | 7/1994 |
| EP | 0903324 | 3/1999 |

OTHER PUBLICATIONS

JP 0–5161896, Patent Abstracts of Japan, Jun. 29, 1993.
Article, Heft 27 VO, . . . "Neuere Erkenntnisse üver die Adsorption in Aktivkohlefiltern".

* cited by examiner

Primary Examiner—Chester T. Barry
(74) Attorney, Agent, or Firm—R W Becker & Associates; R W Becker

(57) ABSTRACT

The invention relates to the purification of untreated water which is polluted with dissolved organic carbon compounds which can be biologically or adsorptively removed in a three-step process, whereby the upstream purification step is predominantly biological, i.e. operates as a biofilter (1), and both subsequent purification steps are predominantly adsorptive in nature, i.e. operate as adsorbers (2, 3). The biofilter (1) is purified by backwashing, whereby the backwashing periods occur according to the TOC determined between the biofilter (1) and the upstream adsorber (2) and/or running time and/or pressure loss. The upstream adsorber (2) is also cleaned by backwashing and is subsequently shifted into a downstream position alternating with the other adsorber (3). The method is suitable for obtaining TOC concentrations in treated water of less than 500 ppb.

13 Claims, 1 Drawing Sheet

METHOD AND APPARATUS FOR PURIFYING UNTREATED WATER

BACKGROUND OF THE INVENTION

The invention relates to a method as well as an apparatus for the purification of untreated water that is polluted with substances, especially dissolved organic carbon compounds, that can be biologically and adsorptively removed, especially for the preliminary purification of chlorine-free drinking water as a preliminary step for the production of high-purity water from which minerals and salts have been completely removed.

SUMMARY OF THE INVENTION

It is an object of the invention to enable a particularly effective and hence particularly economical purification of the untreated water.

To accomplish this, the invention proposes, that the purification is carried out in three stages, that the upstream purification stage is operated predominantly biologically as a biofilter, and the subsequent purification stages are operated predominantly adsorptively as adsorbers, that the biofilter is cleaned by backwashing, whereby the backwash periods are initiated as a function of the TOC determined between the biofilter and the upstream adsorber and/or as a function of the running time and/or as a function of the pressure loss over the biofilter, and that the upstream adsorber is cleaned by backwashing and is then shifted to the downstream position by alternating it with the other adsorber.

Biofilters for the purification of untreated water, for example for the production of drinking water, are known. It is also known to use adsorbers for the water purification. In both cases one operates with activated carbon, as is also preferably the case with the present invention. The effectiveness of the known methods is, however, limited. In addition, the activated carbon must frequently be exchanged, resulting in a considerable cost burden. Also known is the use of microfilters, whereby these filters allow a very high degree of effectiveness to be achieved. They are even suitable for producing ultra pure water, as is required for the manufacture of chips. However, the costs for carrying out a microfiltration are extremely high.

The inventively proposed 3-stage method is in a position to achieve a high degree of effectiveness at a relatively low cost. The method serves primarily as a preliminary stage for the production of high-purity water for industrial use. Involved is a closed process with which only easily usable residues result. The method is suitable for achieving TOC concentrations in processed water of <500 ppb.

The untreated water is conditioned in such a way that in the biofilter a high biological activity is achieved that is enhanced by an extensively constant hydraulic charge. The biofilter is monitored by determining the TOC (TOC stands for Total Organic Carbon) in the filtrate. As soon as the TOC has risen to a prescribed value, a backwashing of the biofilter is effected. A break-through of TOC to the upstream adsorber can thus be effectively prevented. There is also no blockage of the biofilter. The backwashing reduces the solid content/biomass to the respective minimum quantities that are required for the reliable functioning of the biofilter. The activated carbon of the biofilter does not need to be exchanged. In addition, or alternatively to the TOC monitoring, the backwashing of the biofilter can also be initiated as a function of the running time (determined by the throughput) or as a function of the pressure loss over the biofilter.

The subsequent, upstream adsorber is also backwashed, and is thereby protected against premature depletion. It serves to receive and to adsorb the slippage of TOC and impurities that occurs in the biofilter. The upstream adsorber has only a very slight biological function. Its effectiveness is predominantly an adsorption function to reduce the adsorptively removable TOC. As a consequence of the backwashing, the activated carbon is kept in a mechanically clean state and remains effective for a long period of time, so that an exchange is required only at very great time intervals. This contributes considerably to the economy of the inventive method.

The downstream adsorber enables not only an optimization of the purification process, but rather also permits a nearly constant and continuous maintenance of a very high effectiveness. In particular, if the upstream adsorber is cleaned, the downstream adsorber takes over its function. It thus becomes the upstream adsorber, where upon the freshly cleaned adsorber assumes the downstream position, and now in turn optimizes the purification process. The shift or alternation enables a high and constant adsorption efficiency and the utilization of the full adsorption capacity of both of the adsorbers.

A preferred application of the invention is the pre-purification during the production of high-purity water from which salts and minerals are completely removed, as it is used, for example, as process water in industrial processing engineering and the chemical industry, or also as feed water for boiler plants. Following the purification is a salt or mineral removal stage that operates as reverse osmosis or ion exchange.

An important recognition that lies at the basis of the invention is that after the removal of chlorine, the growth of micro organisms increases suddenly due to the increased substrate content. Without the effective reduction of substrate concentration made possible by the invention, there would thus result an impermissible contamination of the downstream unit for removing salt and minerals due to germination and biofouling. In the biofilter, the substrate concentrations are mineralized and are converted into the biomass or into other substances. These and non-assimilated substances (TOC slippage) are adsorbed in the subsequent adsorbers.

By means of suitable conditioning measures, primarily by regulating the temperature and the oxygen content, a high biological activity is maintained in the biofilter. With a relatively long contact time, there results a reduction of the predominantly biologically removable TOC. The subsequent adsorbers reduce the adsorptively removable TOC.

The biofilter can be built up during the operation. More advantageous is to use an already seeded filter.

As a further development of the invention, it is proposed that the backwashing of the biofilter be synchronized with the backwashing of the upstream adsorber. During the backwashing of the biofilter, the upstream adsorber should be ready for use, so that in cooperation with the downstream adsorber it can briefly help assume the function of the biofilter. The time control is in this connection preferably such that the shifting of position of the two adsorbers has taken place shortly before the backwashing of the biofilter is carried out.

It can furthermore be advantageous to initiate the backwash periods of the upstream adsorber as a function of the TOC that is determined between this adsorber and the downstream adsorber. The backwash periods of the upstream adsorber, and possibly synchronously therewith the backwash periods of the biofilter, can thus also be initiated as a function of the loading of the upstream adsorber. This prevents an overloading of the downstream adsorber.

The reliability of the purification process can additionally be increased by additionally or alternatively initiating the backwashing periods as a function of the pressure loss determined over the upstream adsorber.

Each of the backwashing periods preferably includes a lowering of the water level in the biofilter or in the upstream adsorber, and then a backwashing with air and/or with water. After the lowering of the water level, it is particularly advantageous to first loosen the activated carbon with air, so that a subsequent backwashing with water results in a particularly high degree of effectiveness. This is of particular significance with regard to the time required for the backwashing. Finally, during the backwashing the three-stage purification process is reduced to a two-stage process.

Pursuant to a significant further development of the invention, it is proposed that during times that are free of a removal of water, the biofilter be separated from the upstream adsorber, and the two adsorbers be switched off.

Frequently, for example on weekends and holidays, there is no need to make purified or pre-purified water available. In this connection, the unit cannot be switched off, since otherwise the biofilter would be adversely affected. However, if during the times that are free of water removal one would charge the adsorbers with the filtrate of the biofilter, the inherently produced purified or pre-purified water would have to be discarded. After switching off the adsorbers, it is merely necessary to re-circulate the filtrate of the biofilter. It is of particular significance that during the times that are free of water removal the adsorbers in no way be charged by the filtrate of the biofilter. This increases the time spans between the backwash periods of the upstream adsorber, and extends the service life of the activated carbon filling of the two adsorbers.

During the times that are free of the removal of water, the biofilter, which is separated from the upstream adsorber, is preferably operated with a reduced throughput, since this is sufficient for maintaining the biological activities.

Thus, the invention makes it possible to avoid the TOC slippage through the entire unit. The danger of a bacterial contamination of downstream components of the unit is greatly reduced. The same applies for the blockage of functional groups of the ion exchange resin of the unit for the complete removal of salt and minerals. The operating costs are reduced, and only easily usable residues are produced.

The invention furthermore provides an apparatus for carrying out the previously described method, namely for the purification of untreated water that is polluted with substances, especially dissolved organic carbon compounds, that can be biologically and adsorptively removed, especially for the preliminary purification of drinking water from which chlorine has been removed as a preliminary step for the production of high-purity water from which minerals and salts have been completely removed, whereby this apparatus has the following features:

a feed line for untreated water,
a drain line for purified water,
a biofilter, the inlet of which is connected to the feed line for untreated water,
a first and a second adsorber, the inlets of which are connectable to the feed line for untreated water and to the outlet of the biofilter, and the outlets of which are connectable to the drain line for purified water, whereby furthermore the outlet of the first adsorber is connectable to the inlet of the second adsorber and the outlet of the second adsorber is connectable to the inlet of the first adsorber,
a feed line as well as a drain line for backwash water and/or a feed line for backwash air, whereby the lines are connectable to the biofilter as well as to each of the two adsorbers, and
a control device for the operation of the valves that are associated with the biofilter and each of the two adsorbers, whereby the control device is connected with a TOC measurement location on the outlet of the biofilter and/or with a throughput measurement device and/or with a differential pressure measurement device for the biofilter.

Further preferred features are provided in the dependent claims.

BRIEF DESCRIPTION OF THE DRAWINGS

The invention will be explained in greater detail subsequently with the aid of a preferred embodiment in conjunction with the accompanying drawing. The drawing shows in.

DESCRIPTION OF PREFERRED EMBODIMENTS

Figure 1:
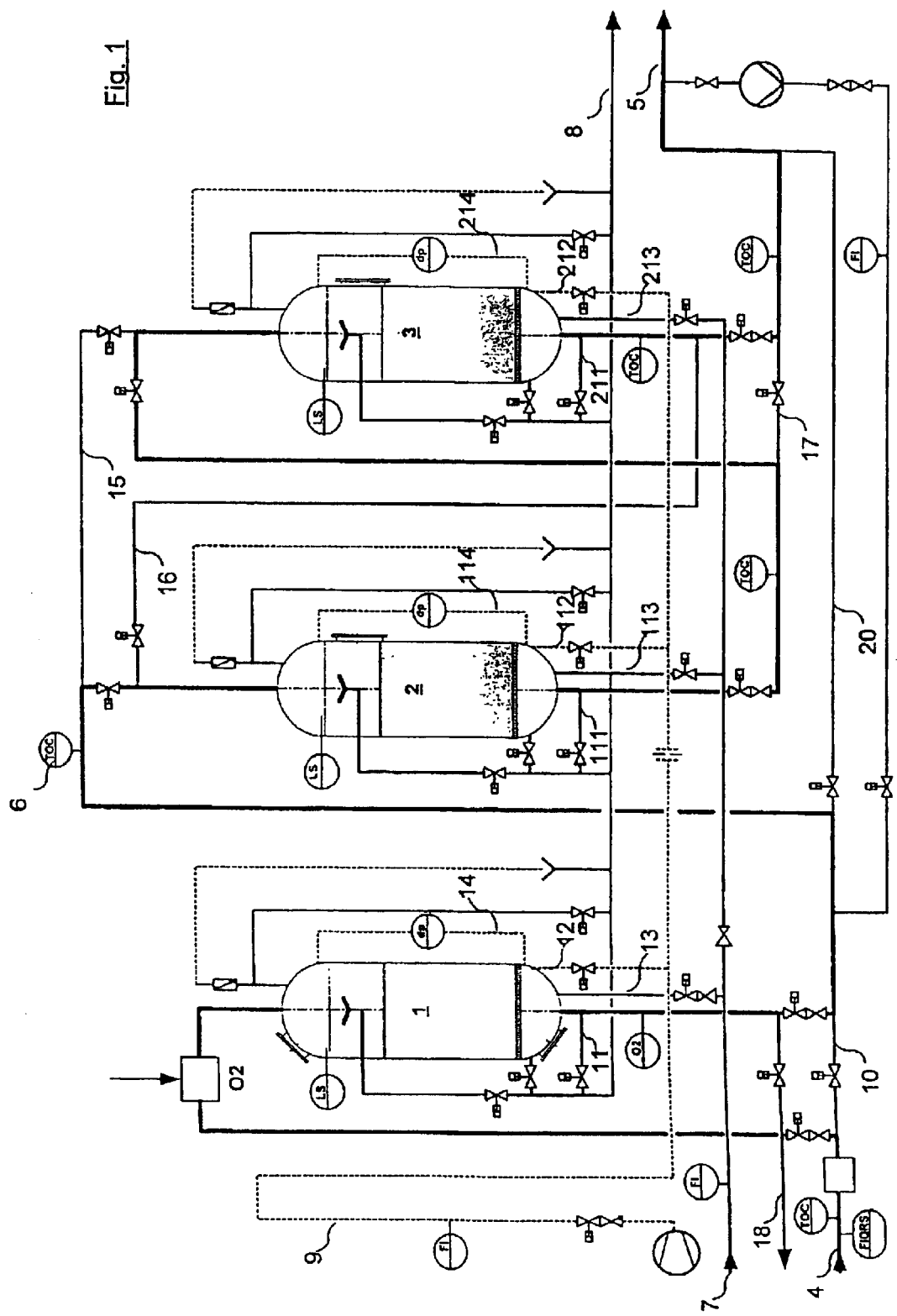
FIG. 1 a control diagram of an apparatus for the purification of untreated water.

Pursuant to FIG. 1, a biofilter 1 is provided which is followed in series by two adsorbers, namely a first adsorber 2 and a second adsorber 3. The inlet of the biofilter 1 is connected to a feed line 4 for untreated water, whereby it is advantageous to introduce oxygen into the inlet in a controlled manner in order to avoid an under supply of oxygen to the micro organisms. Furthermore, the outlet of the second adsorber 3 is connected to a drain line 5 for purified water. The temperature of the feed of the biofilter is preferably monitored and regulated.

The diagram of FIG. 1 shows in heavy, solid lines one of the paths that the water can take from the feed line 4 for untreated water through the biofilter 1 and the two adsorbers 2 and 3 to the drain line 5 for purified water. In accordance therewith, the adsorber 2 operates as an upstream adsorber. It adsorbs a significant portion of the TOC that overflows out of the biofilter 1. Its biological activity is slight. Emphasized is its adsorption capacity.

The downstream adsorber 3 optimizes the purification process and, after appropriate shifting, takes over the function of the upstream adsorber, while the first adsorber is backwashed and is then shifted to the downstream position.

Provided at the outlet of the biofilter 1 is a TOC measurement location 6. It is in communication with a non-illustrated control device that operates the plurality of valves that are associated with the unit. As soon as the TOC measurement location 6 indicates a preselected value, the biofilter 1 is shifted to backwash.

The backwash system includes a feed line 7 and a drain line 8 for backwash water, as well as a feed line 9 for backwash air.

The backwashing of the biofilter 1 is initiated by closing its inlet and its outlet. A line section 20 serves as a bypass and connects the inlet of the first adsorber 2 with the feed line 4 for untreated water. The water level in the biofilter 1 is then lowered, and in particular via a line section 11 that connects its outlet with the drain line 8 for backwash water. There is then effected a loosening of the activated carbon in the biofilter 1. For this purpose, the latter is connected via a line section 12 to the feed line 9 for backwashed air. Venting can be effected into the drain line 8 for backwash water. As the last step, the biofilter 1 is connected via a line section 13 to the feed line 7 for backwash water. As soon as the cleaning process is terminated, the original operation is again undertaken.

As an additional safety measure, the biofilter 1 is provided with a differential pressure measurement device 14 that is connected to the control device and ensures that the backwashing of the biofilter 1 is started even if the pressure drop over the biofilter exceeds a prescribed maximum value.

The backwashing of the two adsorbers 2 and 3 is carried out in a corresponding manner. The components required to accomplish this that coincide with those of the biofilter 1 have reference numerals in the hundreds for the adsorber 2 and in the two hundreds for the adsorber 3.

The backwashing of the upstream adsorber, which according to the control diagram illustrated in heavy, solid lines in FIG. 1 is the first adsorber 2, can be effected synchronously with the backwashing of the biofilter 1, although under the condition that the latter is in operation. As a first step, the inlet of the adsorber 2 is closed, whereby at the same time the inlet of the adsorber 3 is connected to the outlet of the biofilter 1, and in particular via a line section 15.

The adsorber 3 now takes over the entire adsorption capacity. After its outlet is closed, the adsorber 2 is backwashed in the same way as was described in conjunction with the biofilter 1.

After conclusion of the backwashing of the adsorber 2, it is connected downstream of the adsorber 3. The latter thus obtains its upstream position, while the adsorber 2 assumes the downstream position. For this purpose, the connection between the outlet of the adsorber 3 and the drain line 5 for purified water is interrupted. Instead, the outlet of the adsorber 3 is connected to the inlet of the adsorber 2, and in particular via a line section 16. The now again opened outlet of the adsorber 2 is connected via a line section 17 with the drain line 5 for purified water. At the appropriate time, the now upstream adsorber 3 is backwashed in the same manner as was described in connection with the biofilter 1.

On days that are free of the withdrawal of water (e.g. weekends and holidays) no purified water is needed. One separates the outlet from the biofilter 1 from the drain line 5 for purified water, and connects it to a removal line 18. At the same time, the throughput of the biofilter 1 is reduced, preferably to approximately one third of the normal operating throughput.

For the emergency situation where both of the adsorbers 2 and 3 are disrupted, a bypass line 20 is provided that connects the outlet of the biofilter 1 directly to the drain line 5 for purified water.

The method of the invention is preferably operated with a constant throughput capacity. This leads to optimal contact times and to a defined mass transfer. It was discovered that a reduction of the TOC value to approximately 500 ppb could be achieved. This is an average value that is subjected to only slight fluctuations. The invention thus enables very long service lives in combination with a very high TOC reduction.

Various modification possibilities are within the scope of the invention. For example, the separate removal line 18 for the biofilter 1 can be eliminated if a possibility is provided for connecting the outlet of the biofilter 1 to the drain line 8 for backwash water. Furthermore, one can dispense with the use of backwash air if no loosening of the activated carbon is desired. Alternatively, the possibility exists for carrying out the backwashing with only air. The synchronization of the upstream adsorber with the backwashing of the biofilter can be a fixed coupling determined by a time interval. It is then possible to dispense with the TOC measurement locations 106 and 206 as well as with the pressure differential devices 114 and 214. The operation is more flexible if merely the sequence of the backwashing processes is maintained. The exchange of the activated carbon of the two adsorbers can be integrated into the backwash cycles. It is not necessary to exchange the activated carbon of the biofilter.

As a modification of the described unit, it is possible to carry out the backwashing of the biofilter and/or of the upstream adsorber only as a function of the running time or only as a function of the build up of the respective pressure drop. However, the TOC measurement has proven to be a very reliable control. The mechanical cleaning of the adsorbers is, as mentioned, preferably carried out first with air and subsequently with water. A purely air or water backwashing is, as also already mentioned, likewise possible.

The specification incorporates by reference the disclosure of German priority document 199 62 791.6 filed Dec. 23, 1999 and International priority document PCT/EP00/12733 filed Dec. 14 2000.

The present invention is, of course, in no way restricted to the specific disclosure of the specification and drawings, but also encompasses any modifications within the scope of the appended claims.

What is claimed is:

1. A method of purifying untreated water that is polluted with substances that can be biologically and adsorptively removed, wherein purification is carried out in three stages, and said method includes the steps of:
    operating an upstream purification stage as a biofilter, while subsequent downstream purification stages are operated as adsorbers;
    cleaning said biofilter by backwashing, wherein backwashing periods are initiated as a function of at least one of: TOC determined between said biofilter and an upstream one of said adsorbers, a running time, and a pressure loss over said biofilter; and
    cleaning said upstream adsorber by backwashing and then shifting this adsorber to a downstream position by alternating it with another one of said adsorbers.

2. A method according to claim 1, which includes the step of synchronizing backwashing of said biofilter with backwashing of said upstream adsorber.

3. A method according to claim 1, which includes initiating backwash periods of said upstream adsorber as a function of TOC determined between said upstream adsorber and a downstream one of said adsorbers.

4. A method according to claim 3, wherein said initiation of said backwash periods is additionally effected as a function of a pressure loss determined over said upstream adsorber.

5. A method according to claim 3, wherein each of said backwash periods includes a lowering of a water level in said biofilter or in said upstream adsorber, and then a backwashing with at least one of air and water.

6. A method according to claim 1, wherein during periods of time that are free of a removal of water, said biofilter is separated from said upstream adsorber, and said adsorbers are shut off.

7. A method according to claim 6, wherein said biofilter, which is separated from said upstream adsorber, is operated at a reduced throughput.

8. A method according to claim 1, wherein an initiation of backwash periods of said upstream adsorber is effected as a function of a pressure loss determined over said upstream adsorber.

9. An apparatus for purifying untreated water that is polluted with substances that can be biologically and adsorptively removed, said apparatus comprising:
- a feed line for untreated water;
- a drain line for purified water;
- a biofilter having an inlet and an outlet, wherein said inlet is connected to said feed line;
- a first adsorber having an inlet and an outlet;
- a second adsorber having an inlet and an outlet, wherein said inlets of said adsorbers are connectable to said feed line and to said outlet of said biofilter, wherein said outlets of said adsorbers are connectable to said drain line, wherein said outlet of said first adsorber is connectable to said inlet of said second adsorber, and wherein said outlet of said second adsorber is connectable to said inlet of said first adsorber;
- at least one of a feed and drain line for backwash water, and a feed line for backwash air, wherein said lines are connectable to said biofilter and to each of said adsorbers; and
- a control device for operating valves that are associated with said biofilter and each of said adsorbers, wherein said control device is connected to at least one of: a TOC measurement location associated with said outlet of said biofilter, a throughput measurement device, and a differential pressure measurement device for said biofilter.

10. An apparatus according to claim 9, wherein the outlet of each of said adsorbers is provided with a respective TOC measurement location that is connected to said control device.

11. An apparatus according to claim 9, wherein each of said adsorbers is provided with a respective differential pressure measurement device that is connected to said control device.

12. An apparatus according to claim 9, wherein said outlet of said biofilter is connectable to a removal line.

13. An apparatus according to claim 9, wherein a recirculation line is provided that is connected to said drain line for purified water and that is connectable to said outlets of each of said adsorbers.

* * * * *

UNITED STATES PATENT AND TRADEMARK OFFICE
CERTIFICATE OF CORRECTION

PATENT NO. : 6,852,228 B2  Page 1 of 1
APPLICATION NO. : 10/169054
DATED : February 8, 2005
INVENTOR(S) : Keil et al.

It is certified that error appears in the above-identified patent and that said Letters Patent is hereby corrected as shown below:

Title page,
Item [73], should read as follows:
-- [73] Assignee: Steag Encotec GmbH, Essen (DE);
Kraftwerks- und Netzgesellschaft mbH, Rostock (DE);
DVGW-Forschungsstelle TUHH, Hamburg (DE) --.

Signed and Sealed this

Twenty-seventh Day of June, 2006

JON W. DUDAS
*Director of the United States Patent and Trademark Office*